United States Patent [19]

Simroth et al.

[11] E Patent Number: Re. 32,733

[45] Reissued Date of Patent: Aug. 16, 1988

[54] POLYMER/POLYOL COMPOSITIONS HAVING IMPROVED COMBUSTION RESISTANCE

[75] Inventors: Donald W. Simroth, Charleston; Frank E. Critchfield; Edgar G. Shook, both of S. Charleston, all of W. Va.

[73] Assignee: Union Carbide Corporation, Danbury, Conn.

[21] Appl. No.: 808,268

[22] Filed: Dec. 12, 1985

Related U.S. Patent Documents

Reissue of:

[64] Patent No.: 4,463,107
Issued: Jul. 31, 1984
Appl. No.: 409,177
Filed: Aug. 18, 1982

U.S. Applications:

[63] Continuation-in-part of Ser. No. 378,651, May 18, 1982, abandoned.

[51] Int. Cl.[4] ..... C08L 75/04

[52] U.S. Cl. ..... 521/137; 524/310; 524/377; 524/760; 524/762

[58] Field of Search ..... 521/137; 252/182; 524/310, 377, 760, 762

[56] References Cited

U.S. PATENT DOCUMENTS

| | | | |
|---|---|---|---|
| Re. 28,715 | 2/1976 | Stamberger | 521/137 |
| Re. 29,118 | 1/1977 | Stamberger | 521/137 |
| 3,304,273 | 2/1967 | Stamberger | 521/137 |
| 3,383,351 | 5/1968 | Stamberger | 521/137 |
| 3,655,553 | 4/1972 | De Wald | 252/1 |
| 3,850,861 | 11/1974 | Fabris et al. | 260/2.5 BE |
| 3,875,258 | 4/1975 | Patton, Jr. et al. | 252/182 |
| 3,953,393 | 4/1976 | Ramlow et al. | 252/182 |
| 4,093,573 | 6/1978 | Ramlow et al. | 260/2.5 BE |
| 4,119,586 | 10/1978 | Shah | 521/137 |
| 4,122,056 | 10/1978 | Ramlow et al. | 260/2.5 NR |
| 4,140,667 | 2/1979 | Preston et al. | 521/137 |
| 4,148,840 | 4/1979 | Shah | 521/137 |
| 4,172,825 | 10/1979 | Shook et al. | 528/75 |
| 4,214,055 | 7/1980 | Seefried, Jr. et al. | 521/137 |
| 4,230,823 | 10/1980 | Alberts et al. | 521/137 |
| 4,242,249 | 12/1980 | Van Cleve et al. | 252/356 |
| 4,242,476 | 12/1980 | Shah et al. | 526/71 |
| 4,357,430 | 11/1982 | Van Cleve | 524/710 |
| 4,454,255 | 1/1984 | Ramlow et al. | 521/137 |
| 4,458,038 | 7/1984 | Ramlow et al. | 525/41 |

FOREIGN PATENT DOCUMENTS

| | | |
|---|---|---|
| 735010 | 5/1966 | Canada . |
| 785835 | 5/1968 | Canada . |
| 503 | 7/1978 | European Pat. Off. . |
| 73588 | 6/1976 | Japan . |
| 1477333 | 2/1974 | United Kingdom . |

*Primary Examiner*—Maurice J. Welsh
*Attorney, Agent, or Firm*—Paul W. Leuzzi

[57] ABSTRACT

A stable dispersion of a polymer in a polyol which imparts improved combustion resistance to polyurethane foams prepared therefrom wherein the polymer is a free-radical initiated copolymer containing from about 0.5 to 75 weight percent, based on the copolymer, of acrylonitrile and from about 25 to 99.5 weight percent, based on the copolymer, of at least one other polymerizible ethylenically unsaturated monomer and wherein the copolymer is characterized by a crosslinking coefficient of less than 55.

24 Claims, No Drawings

POLYMER/POLYOL COMPOSITIONS HAVING IMPROVED COMBUSTION RESISTANCE

Matter enclosed in heavy brackets [ ] appears in the original patent but forms no part of this reissue specification; matter printed in italics indicates the additions made by reissue.

This application is a continuation-in-part of U.S. Ser. No. 378,651 filed May 18, 1982 and now abandoned.

BACKGROUND OF THE INVENTION

The instant invention relates to a novel class of stable dispersions of a polymer in a polyol (hereinafter called polymer/polyol compositions) which can react with organic polyisocyanates to form polyurethane products having improved combustion resistance. The invention also relates to novel polyurethane products prepared from such polymer/polyol compositions. Polymer/-polyol compositions suitable for use in producing polyurethane foams, elastomers, and the like, are known materials. The basic patents in the field are U.S. Pat. Nos. 3,304,273, 3,383,351, U.S. Pat. No. Re. 28,715 and U.S. Pat. No. Re. 29,118 to Stamberger. Such compositions can be produced by polymerizing one or more olefinically unsaturated monomers dissolved or dispersed in a polyol in the presence of a free radical catalyst. Polymer/polyol compositions have the valuable property of imparting to polyurethane foams and elastomers produced therefrom higher load-bearing properties and modulus than are provided by unmodified polyols.

Of the many applications known for polyurethane products derived from polymer/polyol compositions, utility in the automotive industry has ranked among the highest as urethane products were employed in deep foam seating, energy-absorbing padding, moisture resistant foam inside door panels, comfortable and grip-enhancing steering wheel covers and flexible bumpers to name but a few. However, with this application came the requirement that polyurethane products for the automotive industry would have to meet the Federal Motor Vehicle Safety Standard (FMVSS) No. 302, a standard on the combustionability of the products.

The industry has attempted to meet this requirement through the addition of small concentrations of flame retardants to the polyurethane product or by adding to the polymer/polyol various monomers which would impart greater combustion resistance to the final polyurethane product. Unfortunately, most flame retardant additives are not stable in polyurethane premixes and must therefore be metered in as a separate stream to the foam machine mixing head thereby creating the need for special equipment and handling procedures. Additionally, the polymer/polyol compositions containing monomers which improve the combustion resistance of the finished product have proven to be either too costly to commercialize or have special processing problems of their own, such as dehydro-chlorination in the polymer/polyol derived from vinylidene chloride. Accordingly, there continues to be a need for improved polymer/polyol compositions which can impart greater combustion resistance to the finished polyurethane product without incurring the drawbacks previously encountered.

SUMMARY OF THE INVENTION

The present invention provides a stable dispersion of a polymer in a polyol. The dispersion is generally useful in the preparation of polyurethane foams and specifically useful in the preparation of polyurethane foams having improved combustion resistance. The polymer of the dispersion is a free-radical initiated copolymer containing from about 0.5 to 75 weight percent, based on the copolymer, of acrylonitrile and from about 25 to 99.5 weight percent, based on the copolymer, of at least one other polymerizible ethylenically unsaturated monomer and wherein the copolymer is characterized by a crosslinking coefficient of less than 55.

Additionally, the present invention provides a novel polyurethane with improved combustion resistance where the polyurethane is prepared by the reaction of an organic polyisocyanate and the previously described stable dispersion of a polymer in a polyol.

The discovery of the present invention provides a novel polymer/polyol composition which is both stable and imparts to polyurethanes prepared therefrom an increased resistance to combustion over what was previously known in the polymer/polyol art.

DETAILED DESCRIPTION OF THE INVENTION

It has now been discovered by the present inventors that the combustion related deficiencies of polymer/-polyol based polyurethane foams are attributable to the structural properties of the polymer employed in the polymer/polyol composition. Experimental observation of the combustion process has revealed that the source of the problem relative to polyurethane combustion resides in the melt flow characteristics of the polymer employed in the polymer/polyol composition. Analysis has indicated that due to the degree of crosslinking and/or branching (hereinafter generally referred to as the degree of crosslinking) the polymer does not flow readily when exposed to an applied external heat source but chars and emits combustible vapors under increasing temperature rather than becoming fluid and flowing away from the heat source. The degree of crosslinking and/or branching of the polymer refers to the copolymer in the dispersed polymer particles and not to any cross-linking between these discrete polymer particles nor between these discrete polymer particles and the polyol both of which could result in gelation.

The identification of the source of this problem has allowed for the creation of a new polymer/polyol composition by control of various parameters in the preparation of the stable dispersion of a polymer in a polyol previously not identified as affecting the combustion resistance of the finished polyurethane product.

In an effort to quantitatively determine the suitability of the polymer structure in a stable dispersion of a polymer in a polyol a simplified test was established that, when performed on the dispersion, correlated to both the polymer's structure and to the combustion resistance of the finished polyurethane product. As the degree of crosslinking increases the solubility of the polymer in a solvent decreases and the insoluble polymer acts to defract light thereby reducing the amount of light transmitted through the solution which in turn provides a relative measure of the degree of crosslinking. The test consists of determining the light transmission through a dispersion (or solution) of polymer/- polyol in dimethylformamide (DMF) such that one percent of the polymer is present in the dispersion. This dispersion is transferred to one of two matched 1 cm. transmission cells while the second matched cell is filled with DMF (experimental analysis has indicated that the influence of any polyol added to DMF is insignificant within the bounds of normal statistical error and thus can be dispensed within the control cell). A spectrophotometer, such as a Bausch and Lomb Spectronic 710 Spectrophotomer, is calibrated to 100 percent transmission for the transmission of light at 500 millimicrons wave length throught the second, DMF-filled cell. After this calibration the percent light transmission through the first, polymer/polyol/DMF-filled cell is measured and referred to as LT for light transmission.

A crosslinking coefficient (XLC) is then determined by subtracting the light transmission from 100.

$$XLC = 100 - LT$$

Experimentation has demonstrated that when the stable dispersion of a polymer in a polyol has an XLC value of less than 55 improvement in the combustion resistance of the resulting polyurethane becomes apparant. It is preferred that the XLC value be 50 or less with values 20 or less the more preferred and a value of about zero (0) being the most preferred since it represents the least crosslinked or branched polymer and thus the one with the greated melt flow.

The discovery of the source of the problem gave rise to identification of those processing variables which could be adjusted to reduce the degree of crosslinking and/or number of branches per polymer molecule in the stable dispersion of the polymer in the polyol. These process variables include the catalyst concentration, the residence time, the ratio of acrylonitrile to the other polymerizable ethylenically unsaturated monomers and the concentration of chain transfer agents. The process used in producing the polymer/polyol compositions of this invention involves polymerizing the monomers in the polyol while maintaining a low monomer to polyol ratio throughout the reaction mixture during the polymerization. Such low ratios are achieved by employing process conditions that provide rapid conversion of monomer to polymer. In practice, a low monomer to polyol ratio is maintained, in the case of semi-batch and continuous operation, by use of a free-radical polymerization catalyst, control of the temperature and mixing conditions and, in the case of semi-batch operation by slowly adding the monomers to the polyol. The mixing conditions employed are those attained using a back-mixed reactor (e.g., a stirred flask or stirred autoclave). Such reactors keep the reaction mixture relatively homogeneous and so prevent localized high monomer to polyol ratios such as occur in certain tubular reactors. However, tubular reactors can be employed if modified so that increments of the monomer are added to various stages.

The process variables identified above as influencing the degree of crosslinking interact between themselves in such a manner that no one individual variable has parameters which in and of themselves are critical in attaining the necessary degree of crosslinking. In other words, the selection of the level of any one variable depends upon the levels selected for the remaining variables such that the combination of variables results in a XLC value within the limits defined as necessary to obtain the desired end product. Improvement has been observed by increasing the catalyst concentration, lowering the residence time, reducing the proportion of acrylonitrile in the copolymer, increasing the concentration of a chain transfer agent, or various combinations of the above. Preferred ranges are indicated for each variable. Although individual levels for each variable may be selected on the basis of product needs or economic considerations, the overall combination must result in the proper XLC value as determined by the test procedure set forth above.

Control of residence time has been found useful in controlling the degree of crosslinking. In a continuous operation to produce a stable dispersion of a polymer in a polyol the residence time in the first reactor has been found to substantially control the degree of crosslinking in the polymer. By residence in a continuous operation what is meant is that time calculated by dividing the reactor's volume by the volumetric flow rate of the total feed to the reactor. Residence times of from about one (1) minute to about five (5) hours can be employed, preferably from ten (10) minutes to two (2) hours.

In a semi-batch operation where the reactor can be partially charged prior to initiating polymerization, the term residence time refers to that period of time during which significant polymerization between the acrylonitrile and the comonomer(s) is occuring. Here, residence times of from about thirty (30) minutes to about ten (10) hours are recommended.

The monomer feed insofar as it relates to the percent polymer in the dispersion of polymer in the polyol is not limiting so long as the final dispersion is stable and does not separate out upon standing. In this regard, total polymer in the dispersion can range from about 5 weight percent to up to or greater than about 50 weight percent.

The polymerization can also be carried out with an inert organic solvent present. The only requirements in the selection of the solvent is that it does not dissolve the polymer nor interfere with the monomer's polymerization reaction. When an inert organic solvent is used, it is generally removed from the reaction mixture by conventional means before the polymer/polyol composition is used to produce polyurethane foams.

The catalysts useful in producing polymer/polyol compositions in accordance with this invention are the well known free radical type vinyl polymerization catalysts for the formation of polymer polyols, for example, peroxides, azo compounds such as azobisisobutyronitrile, and mixtures thereof.

The catalyst concentration useful in controlling the degree of crosslinking should range from about 0.1 to about 5.0 weight percent based on the total feed to the reactor and preferably from about 0.3 to about 1.0. Although, as mentioned above any free-radical type vinyl polymerization catalyst can be used, 2,2'-azobis-(isobutyronitrile) is preferred because is does not increase the acid number of the product, does not impart an objectionable odor to the product, and does not require special handling, as compared to certain peroxide catalysts.

The temperature used in producing polymer/polyol compositions in accordance with this invention is any temperature at which the catalyst has a desireable rate of decomposition under the reaction conditions. In the case of a continuous process, reaction temperatures of greater than 100° C. are preferred. The maximum temperature used is not narrowly critical but should be lower than the temperature at which significant decomposition of the reactants or product occurs. By way of illustration, 2,2'-azobis(isobutyronitrile) has a preferred temperature range from 105° C. to 135° C.

The prior art has suggested that temperatures at which the half life of the catalyst is no longer than about six minutes is desirable. Temperatures of typical catalysts with half lives of six minutes are:

| Catalyst | Temperature (°C.) |
|---|---|
| Azobisisobutyronitrile | 100° C. |
| Lauroyl Peroxide | 100° C. |
| Decanoyl Peroxide | 100° C. |
| Benzoyl Peroxide | 115° C. |
| p-Chlorobenzoyl Peroxide | 115° C. |
| t-Butyl Peroxyisobutyrate | 115° C. |
| Acetyl Peroxide | 105° C. |
| Propionyl Peroxide | 102° C. |
| 2-t-Butylazo-2-cyanobutane | 129° C. |

Of the monomers useful in the instant invention, acrylonitrile must be present in an amount from about 0.5 to 75 weight percent, based on the copolymers. The remaining 25 to 99.5 weight percent comprises one or more polymerizible ethylenically unsaturated monomers. Acrylonitrile is employed as a necessary monomer in this invention because it forms polymer/polyol compositions that are stable to phase separation and that produce polyurethane foams having superior load bearing properties. Suitable comonomers include styrene and its derivatives, acrylates, methacrylates, nitrile derivatives such as methacrylonitrile, vinyl acetate, and the like. For a more detailed list of suitable comonomers reference is made to U.S. Pat. Nos. 3,931,092; 4,093,573; and the Stamberger patents previously referred to.

It is preferred to employ styrene as the comonomer and in those instances where a terpolymer is desired one of the comonomers is preferably styrene. In controlling the degree of crosslinking it is useful to maintain an acrylonitrile to comonomer or acrylonitrile to termonomer ratio of from about 1:200 to 3:1 and preferably from about 1:3 to 3:1 and most preferably from about 3:7 to about 7:3.

Finally, the addition of chain transfer agents to the polymerization has been demonstrated to be useful in controlling the degree of crosslinking. Chain transfer agents may be added in an amount from about 0.1 to 10 weight percent or more based on the total feed to the reactor and preferably from about 1 to 5 weight percent. Suitable chain transfer agents include any material that exhibits chain transfer activity. Useful classes of chain transfer agents include mercaptans, ketones, alcohols, aldehydes, halogenated compounds, benzene derivatives and the like. Chain transfer agents selected from among such classes may be used alone or in combination. The preferred chain transfer agent is isopropanol due to its low toxicity, low odor, availability, cost effectiveness and ease of removal.

It should be noted that in those instances where the chain transfer agent exhibits strong chain transfer activity somewhat less than 10 weight percent should be employed otherwise the stability of the dispersion could be adversely effected. Although the addition of chain transfer agents in excess of 10 weight percent may be useful in some instances such levels are not generally recommended. In addition, the selection of parameters for the other processing variables may be such that the inclusion of a chain transfer agent may be dispensed with altogether.

Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;

(b) Alkylene oxide adducts of non-reducing sugars and sugar derivatives;

(c) Alkylene oxide adducts of phosphorus and polyphosphorus acids;

(d) Alkylene oxide adducts of polyphenols;

(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerthritol, caprolactone, polycaprolactone, xylitol, arabitol, sorbitol, mannitol, and the like. A preferred class of alkylene oxide adducts of polyhydroxyalkanes are the ethylene oxide and propylene oxide adducts of trihydroxyalkanes.

The polyols employed can have hydroxyl numbers which vary over a wide range. In general, the hydroxyl numbers of the polyols employed in the invention can range from about 20, and lower, to about 150, and higher. The hydroxyl number is defined as the number of milligrams of potassium hydroxide equivalent to the hydroxyl content of one gram of polyol. The hydroxyl number can also be defined by the equation:

$$OH = \frac{56.1 \times 1000 \times f}{m.w.} \quad (A)$$

where

OH = hydroxyl number of the polyol;

f = functionality, that is, a average number of hydroxyl groups per molecule of polyol;

m.w. = molecular weight of the polyol.

The exact polyol employed depends upon the end-use of the polyurethane product to be produced. The molecular weight or the hydroxyl number is selected properly to result in flexible or semi-flexible or rigid foams or elastomers when the polymer/polyol produced from the polyol is converted to a polyurethane. The polyols preferably possess a hydroxyl number of more than 150 for rigid foams, from about 50 to about 150 for semi-flexible foams, and from about 20 to about 70 for flexible foams. Such limits are not intended to be restrictive, but are merely illustrative of the large number of possible combinations of the above polyol coreactants.

If desired, a polyol blend containing a small amount of a high molecular weight polyol and a major amount of a low or a medium molecular weight polyol can be used. Also, a polyol-polymer/polyol blend containing a small amount of a polymer/polyol (prepared in a high molecular weight polyol) and a major amount of a low or a medium molecular weight polyol, as disclosed in U.S. Pat. No. 4,148,840, can be used as the polyol component.

The most preferred polyols employed in this invention include the poly(oxypropylene)glycols, triols, higher functionality polyols and any of these that are capped with ethylene oxide. These polyols also include poly(oxypropyleneoxyethylene)polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. As taught by Stamberger (U.S. Pat. Nos. 3,304,273, 3,383,351, and U.S. Pat. No. Re. 28,715), unsaturation in itself does not affect in any adverse way the formation of the polymer/polyol in accordance with the present invention except in the case where the extent or type of unsaturation is so high or effective as to result in a dispersion of the polymer in a polyol that is gelled. Thus small amounts of unsaturation can be incorporated into the polyol without departing from the scope of the present invention.

The crude polymer/polyol compositions usually contain small amounts of unreacted monomers. Such residual monomers can be converted to additional polymer by employing either a multi-stage operation in a continuous process or an extended cookout time in a semi-batch process. In the event that there are small amounts of unreacted monomer left, they can be removed by using a subsequent stripping step.

In order to be commercially acceptable, a polymer/-polyol composition must have a reasonable degree of dispersion stability. The stability should be sufficient to allow for relatively long term storage without the loss of processability. The polymer/polyol compositions must possess sufficiently small particles so that filters, pumps, and similar components in reactors, foaming and/or elastomer production equipment do not become plugged or fouled in short periods of time. A stable dispersion of the polymer particles in the polyol is of prime consideration in insuring that the polymer/-polyols can be processed in commercial production equipment without the necessity of additional mixing to insure homogeneity.

It has been recognized that the stability of polymer/-polyols requires the presence of a minor amount of a graft or addition copolymer which is formed in situ from the polymer and the polyol. It has been found recently that stability can be achieved also with a preformed copolymeric stabilizer, as disclosed for example in U.S. Pat. No. 4,242,249.

Stability has been achieved by employing a free-radical catalyst and utilizing process conditions which promote rapid conversion of monomer to polymer. In practice, a lower monomer to polyol ratio is maintained by control of the reaction temperature and mixing conditions in the case of a continuous or a semi-batch operation and, in the case of a semi-batch operation, by slow addition of the monomer to the polyol. A back-mixed reactor (e.g., a stirred flask or a stirred autoclave) keeps the reaction mixture relatively homogeneous and so prevents localized high monomer to polyol ratios. The catalyst and temperature are chosen so that the catalyst has a desirable rate of decomposition with respect to residence time in the reactor for a continuous process or to the feed time for a semi-batch process. The half-life of the catalyst at the temperature utilized should be short compared to the time the reactants are in the reaction zone.

Another factor known to affect stability is the molecular weight of the polyol. Generally, the higher the molecular weight, the better the dispersion stability. In case of low molecular weight polyols, the dispersion stability can be improved by using either the polyol blend technique as disclosed in U.S. Pat. No. 4,119,586 or the polyol-polymer/polyol blend technique as disclosed in U.S. Pat. No. 4,148,840.

The invention also provides novel polyurethane products produced by reacting: (a) a polymer/polyol composition of this invention or mixtures thereof either alone or in combination with other polyols and/or polymer/polyol compositions not of this invention and (b) an organic polyisocyanate in the presence of (c) a catalyst. The reaction can be performed in any suitable manner such as by the prepolymer or one-shot technique. When the polyurethane is a foam, the reaction mixture usually also contains a polyol such as the one used to make the polymer/polyol, a blowing agent, and a foam stabilizer.

The organic polyisocyanates that are useful in producing polyurethanes in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as know triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanatotoluene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate; 3,3'-diphenylmethylene diisocyanate; and polymethylene poly(-phenyleneisocyanates) having the formula:

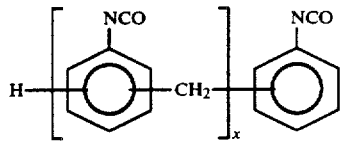

wherein x has an average value from 1.1 to 5 inclusive (preferably from 2.0 to 3.0). The preferred polyisocyanate is about 80% of a mixture of 80% 2,4-tolylene diisocyanate and 20% 2,6-tolylene diisocyanate and about 20% of a polymeric isocyanate.

The catalysts that are useful in producing polyurethane in accordance with this invention include: tertiary amines such as bis(2,2'-dimethylaminoethyl)ether, trimethylamine, triethylamine, N-methylmorpholine, N-ethylmorpholine, N,N-dimethylethanolamine, N,N,N',N'-tetramethyl-1, 3-butanediamine, triethanolamine, 1,4-diazabicyclo[2.2.2.]octane, pyridine oxide, and the like and organotin compounds such as dialkyltin salts of carboxylic acids, e.g., dibutyltin diacetate, dibutyltin dilaurate, dibutyltin maleate, dilauryltin diacetate, dioctyltin diacetate, and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin dichloride, and the like. The catalysts are employed in small amounts, for example, from about 0.001 percent to about 5 percent based on weight of the reaction.

The blowing agents useful in producing polyurethane foams in accordance with this invention include water and halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming for producing flexible foams in the use of water or a combination of water plus a fluorocarbon blowing agent such as trichloromonofluoromethane. The quantity of blowing agent employed will vary with factors such as the density desired in the foamed product.

The foam stabilizers useful in producing polyurethane foams in accordance with this invention include "hydrolyzable" polysiloxane-polyoxyalkylene block copolymer such as the block copolymers described in U.S. Pat. Nos. 2,834,748 and 2,917,480. Another useful class of foam stabilizers includes the "non-hydrolyzable" polysiloxane-polyoxyalkylene block copolymers such as the block copolymers described in U.S. Pat. Nos. 3,505,377 and 3,686,254 and British Patent Specification No. 1,220,471. Yet another useful class of foam stabilizers is composed of the cyanonalkyl-polysilozanes, as described in U.S. Pat. No. 3,905,924.

Polyurethane products produced in accordance with this invention are useful in the applications in which polyurethanes made from conventional polymer/polyol compositions are employed. The polymer/polyol compositions of this invention are particularly useful in the production of high resiliency foams for use in arm rests, mattresses, automobile seats and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

POLYMER/POLYOL PREPARATION

The polymer/polyol compositions of the Examples were prepared continuously in a tank reactor fitted with baffles and an impeller. The feed components were pumped into the reactor continuously after going through an inline mixer to assure complete mixing of the feed components before entering the reactor. The internal temperature of the reactor was controlled to within one degree Centrigrade. The contents of the reactor were well mixed. The product flowed out of the top of the reactor continuously through a back pressure regulator that had been adjusted to give some positive back pressure in the reactor. Portions of the crude product were vacuum stripped at 2 millimeters absolute pressure and 120° to 130° C. for testing. Conversions were determined from analysis of the amount of unreacted monomers present in the crude product before stripping. In Examples 1-9, 18, and 24 the product from the top of the reactor was further reacted in a second stage to increase the conversion of monomer to polymer. All of the polymer/polyols in the Examples were stable compositions.

As used in the Examples appearing below, the following designations, symbols, terms and abbreviations have the indicated meanings.

"Theoretical molecular weight" of a polyol denotes a number average molecular weight calculated using equation (A) above based on the functionality of the starter used to produce the polyol and the experimentally determined hydroxyl number of the polyol.

"Triol" or "Diol" denotes the nominal functionality of a polyol based on the functionality of the starter. Actual polyol functionalities are somewhat lower (3 to 20% lower) than nominal functionality because of the presence of some amount of lower functionality material produced by side reactions. These side reactions are more significant the higher molecular weight of the polyol being produced.

Polyol I: A polyalkylene oxide triol produced from propylene and ethylene oxides and glycerine and having theoretical number average molecular weight of 5000. The alkylene oxide units are present primarily in blocks and the primary OH content is about 75%. The ethylene oxide is used to "cap" the triol. Based on its alkylene oxide content, this triol contains 85 wt. % $C_3H_6O$ and 15 wt. % $C_2H_4O$.

Polyol II: A polypropylene oxide triol produced from propylene oxide and glycerine and having a theoretical number average molecular weight of about 3,000.

Polyol III: A polyalkylene oxide triol, produced from propylene and ethylene oxides and glycerine and having a theoretical number average weight of 4800. The alkylene oxide units are present primarily in blocks and the primary OH content is about 80%. The ethylene oxide is used to "cap" the triol. Based on its alkylene oxide content, this triol contains 83.5 wt. % $C_3H_6O$ and 16.5 wt. % $C_2H_4O$.

Polyol IV: A polyalkylene oxide tetrol produced from propylene and ethylene oxides and pentaerythritol and having a theoretical number average weight of 8000. The alkylene oxide units are present primarily in blocks and the primary OH content is about 82%. The ethylene oxide is used to "cap" the polyol. Based on its alkylene oxide content, this polyol contains 85 wt. % $C_3H_6O$ and 15 wt. % $C_2H_4O$.

Polyol V: A polyalkylene oxide triol produced from propylene and ethylene oxides and glycerine and having a theoretical number average weight of 4300. The alkylene oxide units are present primarily in blocks and the primary OH content is about 80%. The ethylene oxide is used to "cap" the polyol. Based on its alkylene oxide content, this polyol contains 83 wt. % $C_3H_6O$ and 17 wt. % $C_2H_4O$.

Polyol VI: A polyalkylene oxide triol produced from propylene oxide, ethylene oxide, allyl glycidyl ether, and glycerine and having a theoretical number average weight of 4300. The alkylene oxide units are present primarily in blocks and the primary OH content is about 80%. The ethylene oxide is used to "cap" the polyol. Based on its alkylene oxide content, this polyol contains 82 wt. % $C_3H_6O$, 17 wt. % $C_2H_4O$ and 1 wt. % allyl glycidyl ether.

Polyol VII: A mixture of high and low molecular weight polyols formed in situ by coupling some of the polyol molecules of Polyol VI with tolylene diisocyanate such that 0.635 wt. % tolylene diisocyanate is reacted with 99.365 wt. % Polyol VI.

Polyurethane Foam Preparation

TABLE I

| Molded Foam Formulation | |
|---|---|
| Components | Parts |
| Polymer Polyol of Examples | 100 |
| Water | 3.5 |
| Catalyst A-1 | 0.1 |
| Catalyst 33 | 0.36 |
| Catalyst 12 | 0.005 |
| Catalyst B | 0.3 |
| Silicone Surfactant | 0.75 |

| | 80/20 Tolyene Diisocyanate/Polymeric Isocyanate (105 Index) | | | | | | | | | | | |
|---|---|---|---|---|---|---|---|---|---|---|---|---|
| Example No. | 1 | 2 | 3 | 4 | 5 | 6 | 7 | 8 | 9 | 10 | 11 | 12 |
| Reaction Temperature °C. | 125 | 127 | 125 | 145 | 135 | 126 | 145 | 125 | 127 | 125 | 125 | 130 |
| Wt. % Catalyst (1) in feed | 0.43 | 0.33 | 0.72 | 0.35 | 0.37 | 0.35 | 0.35 | 0.74 | 0.75 | 0.75 | 0.75 | 0.58 |
| Wt. % Monomers in feed | 24.6 | 22.5 | 25.3 | 25.9 | 25.9 | 25.9 | 25.7 | 26.0 | 25.9 | 23.3 | 29.6 | 37.4 |
| Monomer Types (4) | A/S | A/S | A/S | A/S | A/S | A/S | A/S | A/S | A/S | A/S | A/S | A/S |
| Ratio of Monomers | 53/47 | 50/50 | 30/70 | 30/70 | 30/70 | 30/70 | 30/70 | 30/70 | 30/70 | 30/70 | 25/75 | 73/27 |
| Polyol Type | I | I | VII | VII | VII | VII | VII | VII | VII | VI | VII | I |
| Residence Time (2), Min | 58 | 52 | 79 | 29 | 21 | 12 | 12 | 21 | 20 | 12 | 12 | 12 |
| Chain Transfer agent (6) | 0 | 0 | 0 | 0 | 0 | 0 | 0 | 0 | 0 | 0 | 0 | ISOP |
| Wt. % CTA (5) in feed | 0 | 0 | 0 | 0 | 0 | 0 | 0 | 0 | 0 | 0 | 0 | 1.9 |
| Monomer Conversion (3), % | 95.6 | 94.2 | 93.0 | 91.6 | 91.5 | 89.6 | 87.8 | 92.4 | 95.1 | 86.6 | 88.5 | 93.5 |
| XLC | 97.1 | 98.2 | 96.4 | 93.3 | 87.7 | 33.1 | 60.1 | 49.5 | 56.8 | 1.3 | 0.8 | 19.6 |
| Total Foam Burn Length, in. | 11.5+ | 11.5+ | 11.5+ | 11.5+ | 11.5+ | 5.4 | 8.0 | 3.8 | 5.5 | 2.2 | 2.6 | 7.7 |
| No. of Reactor stages | 2 | 2 | 2 | 2 | 2 | 2 | 2 | 2 | 2 | 1 | 1 | 1 |
| Example No. | 13 | 14 | 15 | 16 | 17 | 18 | 19 | 20 | 21 | 22 | 23 | 24 |
| Reaction Temperature °C. | 125 | 145 | 125 | 126 | 125 | 125 | 126 | 125 | 110 | 126 | 125 | 126 |
| Wt. % Catalyst (1) in feed | 0.75 | 0.73 | 0.73 | 0.50 | 0.74 | 0.5 | 0.76 | 0.74 | 0.40 | 0.75 | 0.74 | 0.83 |
| Wt. % Monomers in feed | 24.6 | 25.3 | 26.9 | 26.3 | 26.0 | 22.5 | 23.2 | 23.1 | 19.7 | 22.8 | 25.5 | 22.6 |
| Monomer Types (4) | A/S | A/S | A/S/EA | A/MMA | A/AMS | A/S | A/S | A/S | A/S | A/S | A/S | A/S |
| Ratio of Monomers | 65/35 | 2/98 | 30/40/30 | 50/50 | 50/50 | 50/50 | 40/60 | 40/60 | 55/45 | 40/60 | 40/60 | 50/50 |
| Polyol Type | I | V | VII | III | III | I | III | III | II | III | IV | I |
| Residence Time (2), Min | 12 | 18 | 12 | 12 | 12 | 45 | 12 | 12 | 12 | 12 | 12 | 55 |
| Chain Transfer agent (6) | ISOP | 0 | 0 | 0 | 0 | ISOP | EB | DDM | ISOP | THBA | MEK | ISOP |
| Wt. % CTA (5) in feed | 2.0 | 0 | 0 | 0 | 0 | 5.0 | 2.0 | 1.0 | 0.8 | 2.0 | 2.0 | 2.1 |
| Monomer Conversion (3). % | 91.4 | 81.9 | 88.5 | 83.7 | 73.9 | 93.6 | 90.4 | 88.8 | 84.1 | 88.2 | 91.6 | 96.1 |
| XLC | 8.8 | 0.9 | 1.0 | 7.7 | 0.6 | 1.1 | 1.8 | 0.9 | 0.6 | 0.6 | 2.6 | 29.8 |
| Total Foam Burn Length, in. | 2.4 | 2.7 | 2.9 | 2.9 | 2.4 | 1.1 | 1.9 | un-known | un-known | 1.2 | 2.2 | 2.1 |
| No. of Reactor stages | 1 | 1 | 1 | 1 | 1 | 2 | 1 | 1 | 1 | 1 | 1 | 2 |

(1) 2.2' azobis(isobutryonitrile)
(2) first stage only
(3) overall conversion after last stage
(4) A—Acrylonitrile
S—Styrene
MMA—Methyl Methacrylate
AMS—Alpha Methyl Styrene
EA—Ethyl Acrylate
(5) CTA Chain Transfer Agent
(6) ISOP—Isopropanol
EB—Ethyl Benzene
DDM—Dodecyl Mercaptan
THBA—Tetrahydrobenzaldehyde
MEK—Methyl Ethyl Ketone
Note
Example 14 was prepared by the teaching of U.S. Pat. No. 4,242,249 where the added preformed stabilizer was a polyol 50/50 acrylonitrile/styrene copolymer adduct in the proportions of 3 1 and where the polyol contained 1 mole of methacrylate unsaturation per mole of Polyol V and the stabilizer was used in an amount of 40% in the polyol fed to the reactor.

Catalyst A-1: A solution consisting of 70% bis(2-dimethylaminoethyl)ether and 30% dipropyleneglycol.

Catalyst 33: A solution consisting of 33% triethylenediamine and 67% dipropyleneglycol.

Catalyst 12: Dibutyl tin dilaurate

Catalyst B: a mixture of 33% dimethylamino-N,N-dimethyl-propionamide and 67% of a nonionic surfactant.

Molded foams were prepared from the polymer/-polyols of the Examples by the following procedure using the proportions of components shown in Table I. The polymer polyol, water, catalysts, and surfactant were mixed in a one half gallon paper carton fitted with a 4000 rpm mixer and baffles for 55 seconds. The isocyanate was then added rapidly and mixing was resumed for an additional 5 seconds. The mixture is quickly poured into a waxed aluminum mold which had been preheated to 50°-60° C. The mold was then quickly closed and clamped. After two minutes, the mold was placed in an oven at 121° C. for 5 to 8 minutes. The foam was then removed from the mold the post cured 30 minutes at 121° C. After curing the foam specimens were cut and burned per FMVSS-302. The total burn length reported was measured as the distance from the foam edge nearest the flame to the point of extinguishment.

We claim:

1. A stable dispersion of a polymer in a polyol, said dispersion being useful in the preparation of polyurethane foams having improved combustion resistance, wherein the polymer is a [free-radical initiated] copolymer containing from about 0.5 to [75] *70* weight percent, based on the copolymer, of acrylonitrile and from about [25] *30* to 99.5 weight percent, based on the copolymer, of at least one other polymerizable ethylenically unsaturated monomer, *with the proviso that styrene is said other monomer when only one other monomer is present,* and [wherein the] *said* copolymer [is] *being* characterized by a crosslinking coefficient of less than about 55[.], *and being prepared by a free-radical catalyst initiated process carried out in the presence of a chain transfer agent selected from the group consisting of mercaptans, ketones, alcohols, aldehydes and halogenated compounds at a temperature in excess of 100° C.*

2. The stable dispersion of claim 1 wherein the total amount of polymer present in said dispersion is from about 5 to 50 weight percent based on the weight of the dispersion.

3. The stable dispersion of claim 1 wherein the other polymerizable ethylenically unsaturated monomers are selected from the group consisting of styrene and its derivatives, acrylates, methacrylates, nitrile derivatives, and vinyl acetate.

4. The stable dispersion of claim 1 wherein more than one other polymerizable ethylenically unsaturated monomer is present in the polymer.

5. The stable dispersion of claim 1 wherein at least one of the other polymerizable ethylenically unsaturated monomers is styrene.

6. The stable dispersion of claim 1 wherein the copolymer contains from about 25 to [75] *70* weight percent, based on the copolymer, of acrylonitrile.

7. The stable dispersion of claim 1 wherein the copolymer contains from about 30 to 70 weight percent, based on the copolymer, of acrylonitrile.

8. The stable dispersion of claims 1, 6 or 7 wherein the copolymer is characterized by crosslinking coefficient of less than about 50.

9. The stable dispersion of claims 1, 6 or 7 wherein the copolymer is characterized by a crosslinking coefficient of less than about 20.

10. The stable dispersion of claims 1, 6 or 7 wherein the copolymer is characterized by a crosslinking coefficient of about zero (0).

[11. The stable dispersion of claim 1 wherein the copolymer is prepared by a free-radical catalyst initiated process carried out at a temperature 100° C. or higher.]

12. A process for preparing a polyurethane having improved combustion resistance which comprises reacting a stable dispersion of a polymer in a polyol with an organic polyisocyanate in the presence of a catalyst to form such polyurethane wherein the stable dispersion of a polymer in a polyol is the stable dispersion of claim 1 either alone or in combination with other polyols and/or other polymer/polyols.

13. The process of claim 12 wherein the polyurethane is a cellular polyurethane and wherein a blowing agent is additionally present during the reaction.

14. The process of claim 13 wherein there is additionally present a foam stabilizer.

15. The process of claim 12 wherein the stable dispersion is the stable dispersion of claim 6.

16. The process of claim 12 wherein the stable dispersion is the stable dispersion of claim 7.

17. The process of claim 12 wherein the stable dispersion is the stable dispersion of claim 8.

18. The process of claim 12 wherein the stable dispersion is the stable dispersion of claim 9.

19. The process of claim 12 wherein the stable dispersion is the stable dispersion of claim 10.

20. A polyurethane comprising the reaction product of claim 12.

21. A polyurethane comprising the reaction product of claim 15.

22. A polyurethane comprising the reaction product of claim 16.

23. A polyurethane comprising the reaction product of claim 17.

24. A polyurethane comprising the reaction product of claim 18.

25. A polyurethane comprising the reaction product of claim 19.

* * * * *